United States Patent [19]

Miller et al.

[11] 4,087,032
[45] May 2, 1978

[54] SPARE TIRE STOWAGE ASSEMBLY

[75] Inventors: Allan G. Miller, Sterling Heights; John Himka, Farmington; Gerald L. Patrick, Utica, all of Mich.

[73] Assignee: General Motors Corporation, Detroit, Mich.

[21] Appl. No.: 796,126

[22] Filed: May 12, 1977

[51] Int. Cl.² .............................................. B62D 43/04
[52] U.S. Cl. ................................. 224/42.23; 214/454; 224/42.41; 296/37.2
[58] Field of Search ............... 224/42.23, 42.41, 42.12, 224/42.13, 42.14, 42.2, 42.21, 42.26–42.3; 214/DIG. 10, 451, 452, 453, 454; 296/37.2, 37.3

[56] References Cited

U.S. PATENT DOCUMENTS

| 3,187,914 | 6/1965 | Peras | 214/451 |
| 3,435,971 | 4/1969 | Powell | 224/42.23 X |
| 3,712,586 | 1/1973 | Nicholson | 224/42.21 X |
| 3,735,883 | 5/1973 | Hrivnyak | 214/454 |
| 3,776,511 | 12/1973 | Bott | 224/42.21 X |

Primary Examiner—Trygve M. Blix
Assistant Examiner—Sherman D. Basinger
Attorney, Agent, or Firm—K. H. Mac Lean, Jr.

[57] ABSTRACT

A vehicle spare tire carrier and stowage assembly for supporting a tire beneath the floor and to the rear of the axle. The tire is supported in a generally box-like structure having a bottom, side walls, a front end wall but with an open top and rear ends. The support structure is hinge-mounted at the top edge of the forward end wall for selective lowering of the rear portion by a handled actuator which is attached at a rearward portion of the tire support and projects through an opening in the vehicle floor. Once the rear portion of the tire support engages the ground, the tire is easily slid rearward to clear the vehicle overhang by application of a rearward force to the end of a flexible plastic strip member which extends beneath and around the forward end of the tire and is attached at the other end to the vehicle forward of the rear bumper.

2 Claims, 4 Drawing Figures

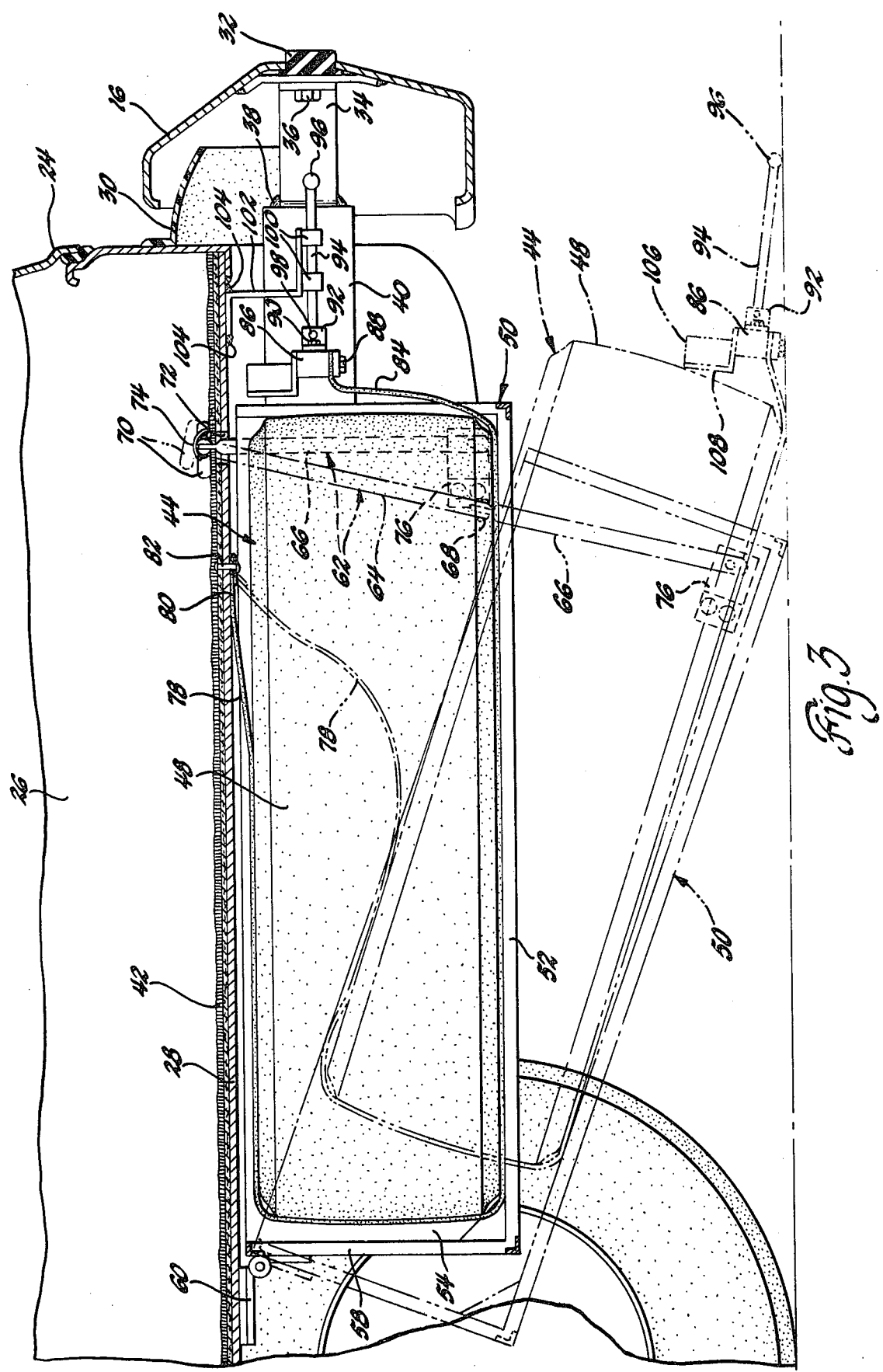

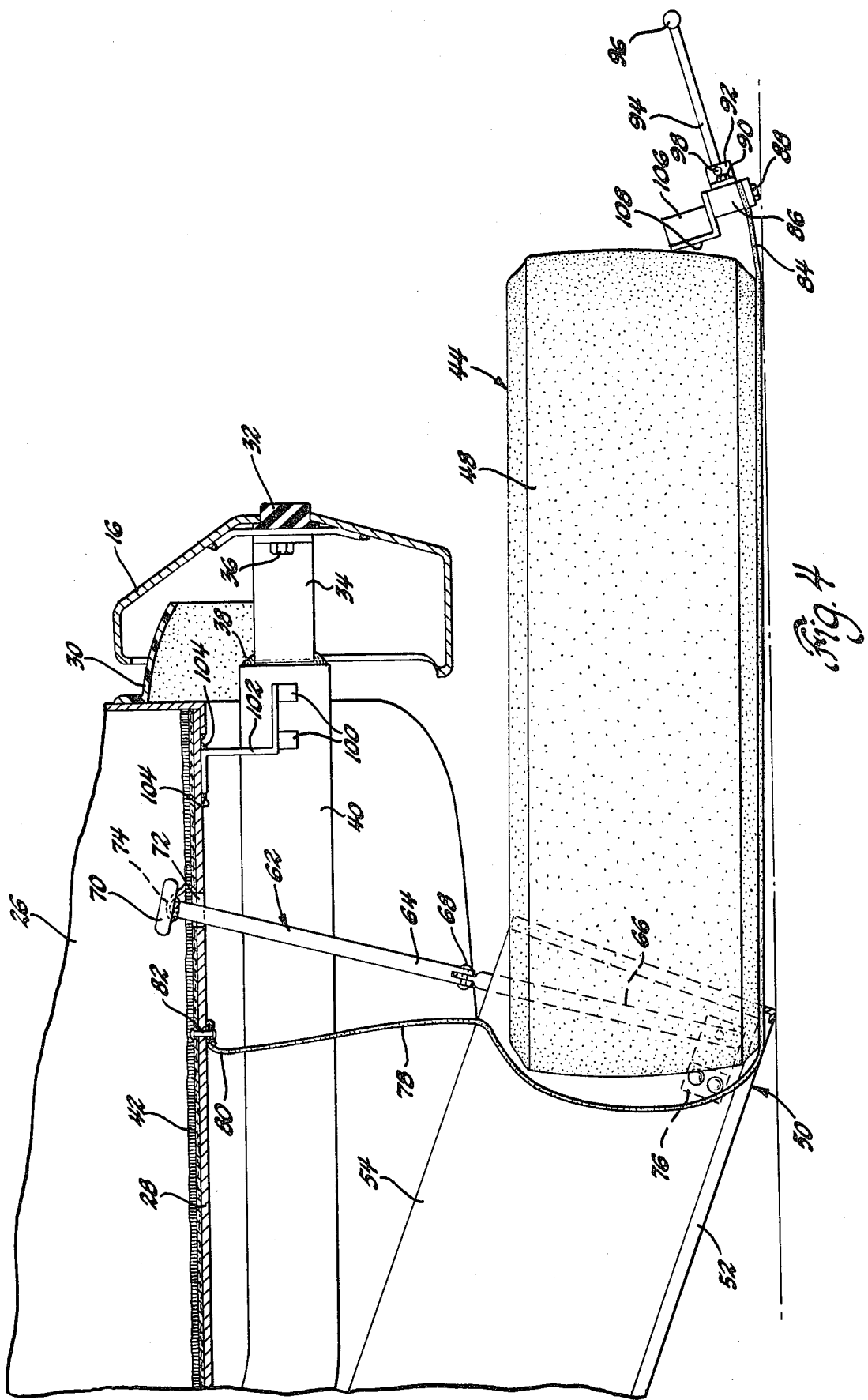

SPARE TIRE STOWAGE ASSEMBLY

This invention relates to a vehicle tire carrier and stowage assembly and particularly to a tire carrier with means to conveniently move the tire rearward from a support structure to a location clearing the rear overhang of the vehicle.

Presently, spare tires are stowed within the vehicle trunk or rear compartment. In this location the tire occupies room which otherwise would be useful for passenger occupancy or cargo area. In station wagon-type vehicles, the spare tire is often supported in a vertical orientation within a well adjacent the side wall of the vehicle. The removal of the tire from the wall is often a difficult task. in other vehicle types, the spare tire is located beneath the floor of the vehicle to provide increased passenger or cargo room within the vehicle. However, it is difficult to remove the tire from the support structure due to the overhang of the vehicle with respect to the tire. This necessitates reaching under the rear of the vehicle to slide or lift the tire. Lifting of any weighty object from a crawl position is obviously very difficult.

The subject invention provides a convenient underfloor tire stowage assembly with simple but effective means to move the tire rearward from a support structure under the vehicle to clear the overhang so that subsequent lifting of the tire is made easier. The subject invention is particularly advantageous for use with vehicles having a rather long rear overhang and where other requirements dictate that the spare tire be stowed close to the rear axle.

The subject invention utilizes a generally box-like structure to support the tire. The support structure is hinged at a forward upper edge and lowering means are attached to a rearward portion for lowering the tire to the ground. Specifically, a handled actuator extends upward from the tire support and projects through an opening in the floor of the vehicle. Thus, the tire can be lowered to the ground from a remote location without stooping or crawling. An open rearward end of the support structure through which the tire can be removed provides desirable access thereto. Subsequent to lowering the tire, the end of a flexible plastic belt or strip is disengaged from a fastener assembly on the frame and moved rearward. The flexible strip passes beneath and around the forward end of the tire and is fastened at a second end to the vehicle frame forward of the rear bumper. Thus, as the first end is pulled rearward, the strip slides the tire out of the open rear end of the support structure and to the rear to clear the overhang of the vehicle so that the tire can then be conveniently lifted.

Further advantageous features of the subject invention will be more readily apparent from the following detailed description, reference being had to the accompanying drawing in which a preferred embodiment is illustrated.

IN THE DRAWINGS

FIG. 3 is a sectioned view of the spare tire carrier assembly taken along section line 3—3 in FIG. 1 and looking in the direction of the arrows;

FIG. 4 is a view similar to FIG. 3 but after the completion of the rearward sliding movement of the tire to clear the rear overhang of the vehicle.

Figure 1:
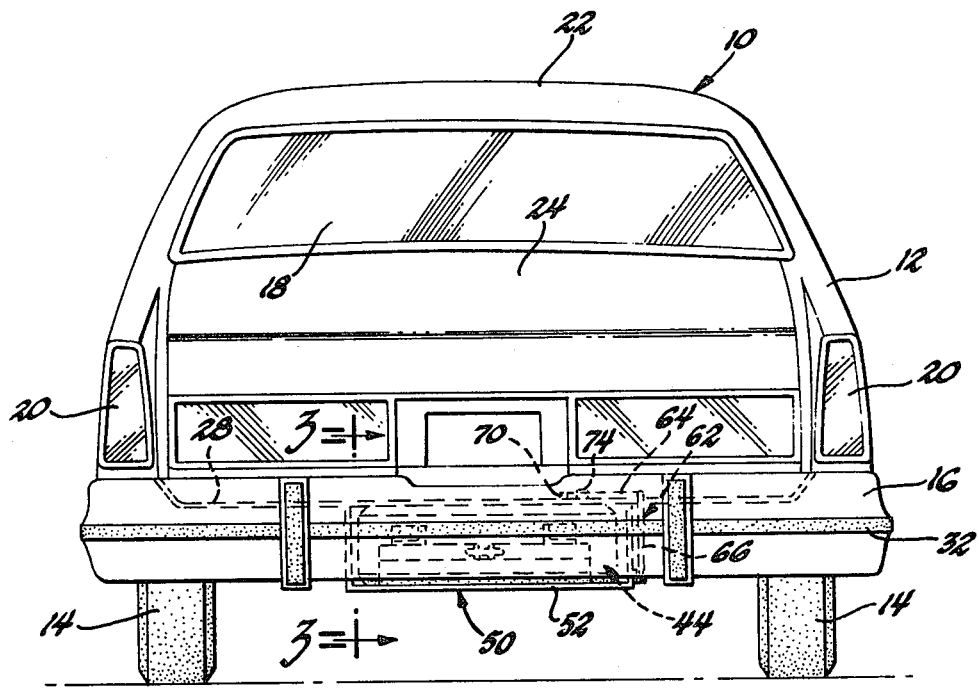
FIG. 1 is an elevational view of a vehicle rear portion disclosing the stowed location of the spare tire and its carrier assembly.
Figure 2:
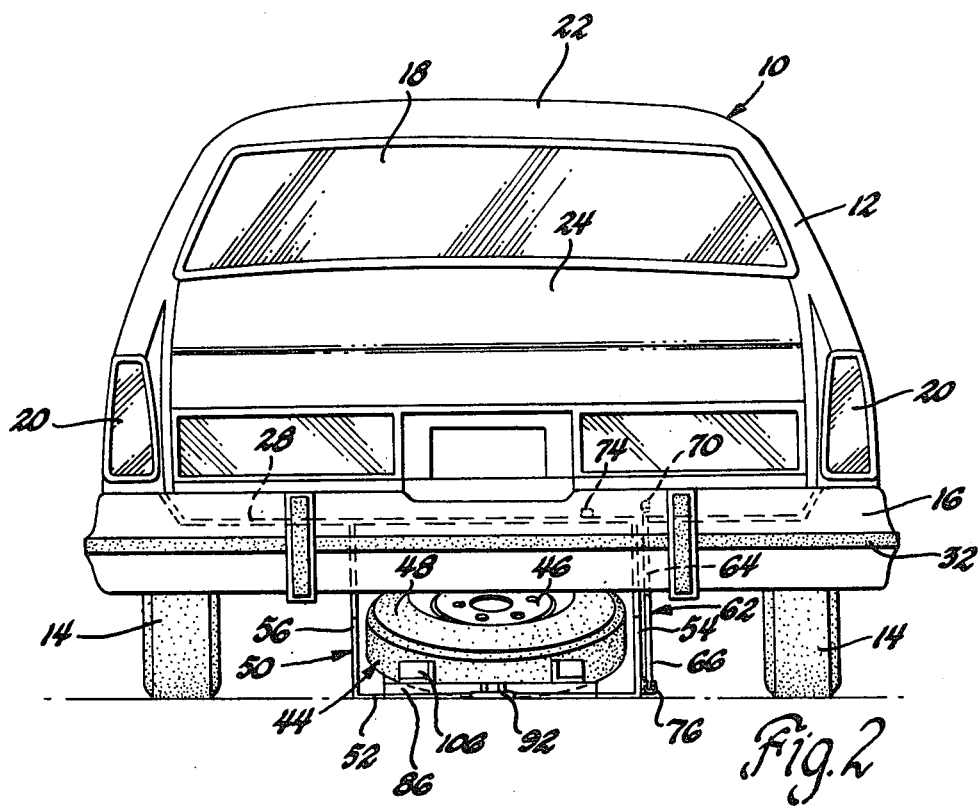
FIG. 2 is a view similar to FIG. 1 but with the tire support structure pivoted downward to the unload position.

In FIGS. 1 and 2, a vehicle 10 is illustrated including a body 12, wheels 14 and a rear bumper 16. Conventional components of the vehicle include a rear window or back light 18, tail lights 20, a roof panel 22 and a deck lid 24. As can be seen in FIGS. 3 and 4, the vehicle 10 has a rear compartment 26 with a floor 28 extending forward of the rear bumper 16. Other details visible in FIGS. 3 and 4 are the plastic filler panel 30 between the body and the bumper 16 and the resilient buffer member 32 running along the center line of bumper 16. A bracket 34 attaches the bumper to the vehicle and is attached to the bumper by fasteners 36 and welded at 38 to the frame 40. A layer of carpeting 42 overlies the floor 28 of the rear compartment 26.

The vehicle spare tire assembly 44 includes a wheel 46 and tire 48 thereon. Normally, the spare tire assembly 44 is disposed in a horizontal orientation beneath the floor 28 of the vehicle and between the rear bumper 16 and the axle. The axle (not shown) extends between rear wheel 14.

The spare tire assembly 44 is supported within a box-like structure 50 which is beneath floor 28. The structure 50 includes a bottom wall portion 52, right and left side wall portions 54, 56 and a forward end wall portion 58. The top and rear ends of the structure 50 are open to permit the tire assembly 44 to slide generally rearward and upward therefrom when the structure 50 is in its lowered position in FIGS. 2-4. The structure 50 is hinged at the upper forward edge by a hinge assembly 60 to permit the rearward end portion of the structure to pivot downward into contact with the ground when tire removal is desired.

The tire assembly 44 and support structure 50 is normally held in an upward position flush with the floor as shown in FIGS. 1 and 3. An actuator assembly 62 permits remote lowering and raising of structure 50 and includes upper and lower rod members 64, 66. The members 64, 66 are joined near the middle by a pin fastener 68 to permit right angle bending of the actuating assembly 62 after the structure 50 is lifted to its stowed flush position with floor 28, thus locking the structure 50 in its raised position. A handle portion 70 on the upper end of the portion 64 is used to raise and lower the structure 50 and to limit the downward movement of the actuator 62 through opening 72 in floor 28. The upper portion 64 of the handle assembly 62 is secured in this position by a clip-type fastener 74 attached to the floor.

The lower portion 66 of actuator 62 is attached to structure 50 by means of a bracket 76 fastened to the rearward portion of the right side wall of the structure 50. The attachment between the lower portion 66 and the bracket 76 permits relative pivotal movement therebetween.

Once the support structure 50 is lowered to a ground-engaging position, the tire assembly 44 may be moved rearward to the position shown in FIG. 4. Then it can be easily slid from underneath the overhang of the vehicle. The tire assembly 44 is conveniently moved rearward by means of an elongated flexible strip of plastic material 78 which is fastened at one end portion 80 to the floor 28 by means of a fastener 82 forward of rear bumper structure 16. The strip 78 extends forwardly with respect to fastener 82 and across the top of the tire assembly 44, then downwardly around the forward portion of the tire assembly and next rearward beneath the tire assembly. It passes between the tire and the bottom 52 of the structure 50. The other end portion 84 of the strip 78 is attached to a bracket 86 by means of fasteners 88. The bracket 86 is connected to a second member having arms 92 by fasteners 90. A handled assembly 94 having a transverse head portion 96 is attached to the arms 92 by a pin fastener 98 which permits the handle assembly 94 to pivot with respect to bracket 86. The handle assembly 94 is normally maintained in a stowed position shown in FIG. 3 by means of retainers 100 which are attached to a flange member 102. The member 102 is attached to the floor 28 by welds 104.

When removal of the tire 44 is desired, the handled actuator 62 is detached from fastener 74 and portions 64 and 66 are aligned to permit movement downward through the opening 72 in floor 28. When the rear portion of the structure 50 engages the ground, the handled actuator 94 is detached from the retainers 100. Rearward pulling movement of the handle 94 from the position shown in FIG. 3 to the position shown in FIG. 4 slides the tire assembly 44 rearward until a portion of the tire assembly 44 clears the bumper structure 16. In this position, the tire is readily slid further rearward and lifted without the need of stooping or crawling on the ground.

Another feature of the present invention is the upstanding bracket portions 106 attached to member 86. The flanges 106 have forward faces 108 which locate the tire assembly 44 with respect to the end 84. Flanges 106 also engage the tire during a loading operation.

The subject invention provides a lightweight and convenient tire carrier and stowage assembly which is preferably made of lightweight high-strength materials. Specifically, the structure 50 may be of a high strength plastic material and may be conveniently molded to any form desired. The flexible strip 78 may be made of several materials, but probably a flexible plastic material having high strength and good toughness characteristics would be best. Such materials as polyethylene and polypropylene are examples of such a material.

Although only a preferred embodiment of the subject invention has been described in detail and illustrated in the drawings, modifications of the invention are contemplated which would still fall within the scope of the invention as claimed hereinafter.

What is claimed is as follows:

1. In a vehicle, a spare tire carrier for underfloor stowage of the tire in a generally horizontal position comprising: a spare tire support structure having a bottom portion extending beneath the tire, a forward end portion extending upward from the bottom portion and upward extending side portions with the top and rear end uncovered for removing the tire from the structure; hinge means between the upper edge of said forward end wall and the vehicle floor to permit lowering of the rear portion of the support structure to the ground; lowering and raising means including an elongated member attached to the rearward portion of the tire support structure and extending upward through an opening in the vehicle floor for remote pivoting of the support structure about the forward hinged edge; an elongated strip of flexible material with one end attached to the vehicle forward of the rear end of the vehicle and extending over the spare tire; then downwardly and across the forward edge of the tire and, finally, rearwardly beneath the tire and between the tire and the bottom portion of the tire support structure; retaining means for detachably securing the second end of said elongated strip to the vehicle at a location rearward from said spare tire and for providing a handle for selectively imparting rearward motive force to the second end of the strip and to the spare tire, thus causing the spare tire to be moved rearward from the support structure to a position out from the vehicle rear overhang.

2. In a vehicle, a spare tire carrier for underfloor stowage of the tire in a generally horizontal position comprising: a spare tire support structure having a bottom portion extending beneath the tire, a foward end portion extending upward from the bottom portion and upwardly extending side portions with the top and rear end uncovered for removing the tire from the support structure; hinge means between the upper edge of said forward end wall and the vehicle floor to permit lowering of the rear portion of the support structure to the ground; lowering and raising means including an elongated member attached to the rearward portion of the tire support structure and extending upward through an opening in the vehicle floor for remote pivoting of the support structure about the forward hinged edge; an elongated strip of flexible plastic material with one end attached to the vehicle forward of the rear edge of the vehicle and extending over the spare tire, then downwardly and across the forward edge of the tire and, finally, rearwardly and beneath the tire and between the tire and the bottom portion of the tire support structure; depending bracket means attached to the vehicle to the rear of the spare tire when in its upward stowed position preventing movement of the tire from the support structure; retaining means for detachably securing the second end of said elongated strip to the vehicle at a location rearwardly from said spare tire and for providing a handle for selectively imparting rearward motive force to the second end of the strip and to the spare tire, thus causing the spare tire to be moved rearward from said structure to a position out from the vehicle rear overhang, upstanding means at said second end of said strip for locating said tire thereon.

* * * * *

UNITED STATES PATENT AND TRADEMARK OFFICE
CERTIFICATE OF CORRECTION

PATENT NO. : 4,087,032
DATED : May 2, 1978
INVENTOR(S) : Allan G. Miller, John Himka, Gerald L. Patrick It is certified that error appears in the above-identified patent and that said Letters Patent are hereby corrected as shown below:

Column 1, line 12, "wall" should read -- well --.

Column 1, line 13, "in" should read -- In --.

Signed and Sealed this

Nineteenth Day of September 1978

[SEAL]

Attest:

RUTH C. MASON
*Attesting Officer*

DONALD W. BANNER
*Commissioner of Patents and Trademarks*